L. A. SHELDON.
STEAM FLOW METER.
APPLICATION FILED JAN. 24, 1912.
1,156,503.
Patented Oct. 12, 1915.
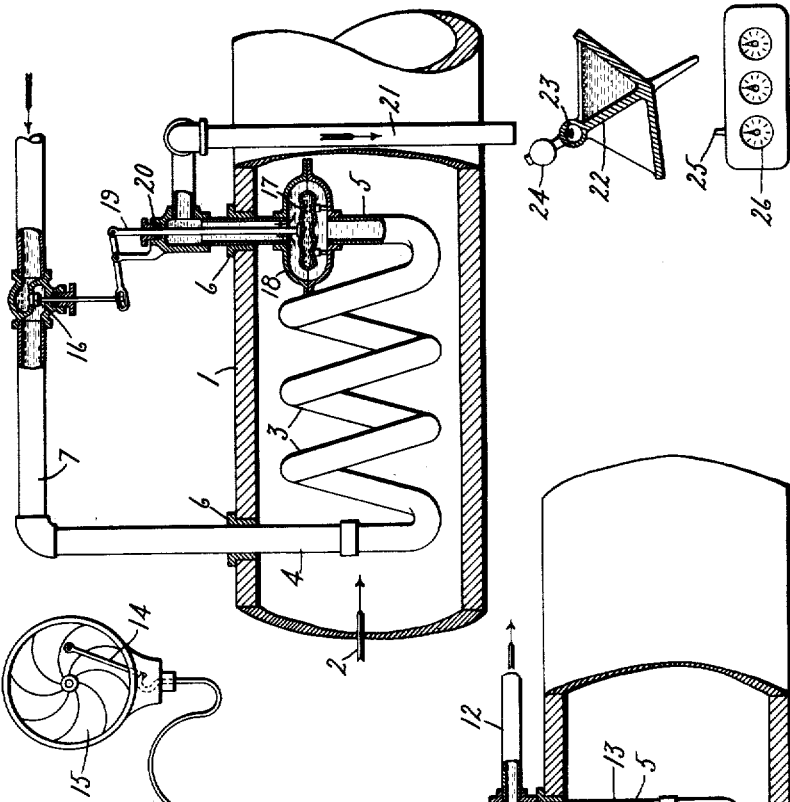
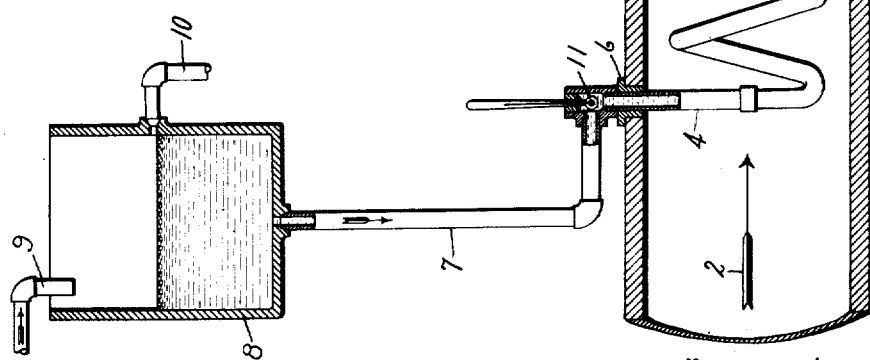
Witnesses:
Adolph Grimm
J. Ellis Glen
Inventor:
Lucian A. Sheldon,
by: Albert G. Davis
His Attorney.

UNITED STATES PATENT OFFICE.

LUCIAN A. SHELDON, OF SCHENECTADY, NEW YORK, ASSIGNOR TO GENERAL ELECTRIC COMPANY, A CORPORATION OF NEW YORK.

STEAM-FLOW METER.

1,156,503.     Specification of Letters Patent.     Patented Oct. 12, 1915.

Application filed January 24, 1912. Serial No. 673,196.

*To all whom it may concern:*

Be it known that I, LUCIAN A. SHELDON, a citizen of the United States, residing at Schenectady, county of Schenectady, State of New York, have invented certain new and useful Improvements in Steam-Flow Meters, of which the following is a specification.

This invention relates to apparatus for measuring the flow of steam or other hot fluid through a main, and its object is to provide a simple and reliable device which will give a direct reading of the quantity of steam or other hot fluid passing in a given time, whether the flow be steady or intermittent.

The invention consists of a flow meter in which a stream of water or other fluid flowing through a pipe is caused to absorb a small proportion of the heat of the steam and the change in the temperature of the water or other fluid is then measured by suitable devices, which give a direct indication of the quantity of steam at a given temperature and pressure required to produce such change.

In one embodiment of my invention I pass a stream of water under constant head through a coil of pipe exposed to the flow of the steam to be measured. A thermometer indicates the changes in temperature of the water in the coil, and since equal quantities of water pass through said coil in equal times, the differences in temperature indicated are a direct indication of changes in the rate of flow of steam flowing past said coil in said times. In another embodiment of this same idea, I provide the water coil with a thermostatic regulating valve, so that the quantity of water flowing is varied in accordance with the variations of the amounts of heat delivered to it by the steam in equal times. By measuring these varying quantities of water, an indication is obtained of the amounts of heat so applied.

In the accompanying drawing, Figure 1 is a diagrammatic illustration of the first embodiment of my invention as above briefly set forth; and Fig. 2 is a similar illustration of the second embodiment or modification.

The steam to be measured flows through the main 1 in the direction of the arrow 2. Located inside this main is a coil of pipe 3, preferably made of thin copper to facilitate the transfer of heat through its walls to the water inside. The end portions or legs 4, 5 of the coil may be made of heavier stock and are radial to the pipe, passing out through the wall of the same through packings or bushings 6 to make tight joints. One of these end portions or legs is connected by a pipe 7 with a tank 8 in which a constant head of water is maintained by a supply pipe 9 and an overflow 10. The cross-sectional area of the pipe 7 is preferably fixed and determined in advance. The amount of water permitted to flow through the pipe 7 should be relatively small so as not to appreciably affect the temperature of the steam or other fluid passing through the main. When the flow is large more water can be permitted to flow through the coil than where the flow is small, as will readily be appreciated.

At a point adjacent to the point of entrance into the coil 4, a thermometer 11 is provided so that the temperature of the water can be observed. Ordinarily the temperature of the water at this point will be constant but it will usually vary with the season of the year unless special precautions are taken to insure a constant temperature. The discharge leg of the coil is provided with an overflow pipe 12. The constant head in the pipe 7 insures the flow of a steady stream of water through the coil, equal volumes passing in equal times.

In the leg to which the overflow pipe 12 is connected there is inserted a heat-responsive device, such as the bulb 13 of a thermometer. This is preferably of the self registering or recording type; such for instance as one which has a pencil-carrying arm 14 marking a record on a slowly rotating dial 15. The dial may be driven by a clock mechanism of suitable construction.

The amount of heat available varies with changes in the rate of flow of stream flowing through the main, and as this heat is taken up by the water passing through the coil, thereby raising its temperature, it follows that if a constant amount of water is used the rise in temperature is a direct measurement of the flow of steam at a given temperature and pressure, provided the temperature of the water in the inlet leg 4 is kept substantially constant. The thermometer therefore gives a true and continuous record of the rate of flow of steam at said temperature and pressure, and as this heat added varies directly as the flow this meter is accurate on either steady or intermittent flow.

In the modification shown in Fig. 2, the flow of the water through the pipe supplying the coil is regulated by a throttle valve 16 which is controlled by a thermostat exposed to the temperature of the water in the outlet leg of said coil. This thermostat may be a body of expansible material, such as mercury, inclosed between flexible diaphragms 17 in a chamber 18 through which the heated water from the coil passes. The expansion of the mercury moves the flexible diaphragms and actuates a rod 19 which passes up through a stuffing box 20 and operates the throttle valve 16 in any suitable manner. The varying quantities of water escaping through the overflow pipe 21 are received in a tilting measuring tank 22, which has two compartments and is pivoted on a knife edge 23. A counterbalance weight 24 keeps one compartment or the other in line with the pipe 21 until it is full, when the water overbalances the weight and tilts the tank to its other position, discharging the water and tripping the actuating lever 25 of a train of registering or counting dials 26. In this modification the aim is to keep the temperature of the water constant by supplying a greater quantity of water when the flow of steam at a given pressure and temperature or density increases and vice versa. The amount of water thus varies directly as the steam flow, and the tilting measuring tank, whose compartments or cups alternately fill and empty, is an accurate means of determining the total amount of water used. The counting mechanism indicates the number of cupfuls of water and thus measures the total flow of steam. The rapidity of operation of said counting or measuring device depends directly upon the action of the heat of the outgoing water upon the mercury in the chamber 18.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The method of determining the flow of a continuously flowing heated fluid passing through a conduit which consists in extracting a small percentage of the heat of the fluid by means of another flowing fluid so that the heat extracted has a definite relation to the rate of flow, and measuring the heat thus extracted.

2. The combination of a main through which a heated fluid flows, a means located in said main for extracting amounts of heat from the fluid that have a definite relation to the rate of flow of the fluid, an indicator device that is calibrated in terms of the rate of flow of the fluid, and means for utilizing the heat thus obtained to vary the position of the indicator device.

3. The method of measuring the flow of steam through a conduit which consists in continuously passing a stream of water at a constant rate of flow in heat exchanging relation to the steam so as to continuously absorb a small proportion of the heat of the steam, which proportion bears a definite relation to the rate of flow, and measuring the change in temperature of said water.

4. The method of measuring steam flow, which consists in continuously subjecting relatively small and equal quantities of water to the heating effect of the flowing steam in equal times so that only a small portion of the heat of the steam is transmitted to the water, and observing the temperature change of said water.

5. Means for determining steam flow, which consists of a coil of piping arranged in heat exchanging relation to the flowing steam, means whereby a stream of water may be passed through the coil, a measuring device calibrated in terms of the rate of flow of the steam, and means for utilizing the temperature of the water to vary the indications of the measuring device.

6. Means for measuring steam flow, comprising a coil of piping exposed to the flowing steam, means whereby a stream of water may be passed through said coil, an expansive body responsive to the variations in the temperature of the water escaping from said coil, a measuring device, and means for utilizing the expansion and contraction of said body to vary the indications of the measuring device.

7. Means for determining steam flow, comprising a coil of piping exposed to the flowing steam, means whereby a constant quantity of water per unit of time may be passed through said coil, and a self-recording thermometer calibrated in terms of the rate of flow of the steam that is exposed to the water in the outlet leg of said coil.

8. The combination with a steam main, of a coil of piping arranged therein and having end portions passing out through the wall of the main, a water tank arranged above the coil and connected with one of said portions so that a stream of water flows through the coil, means whereby a constant head of water is maintained in the tank, a thermometer having its bulb located in the outlet portion of said coil, and means for recording the indications of the thermometer.

In witness whereof, I have hereunto set my hand this 23rd day of January, 1912.

LUCIAN A. SHELDON.

Witnesses:
BENJAMIN B. HULL,
HELEN ORFORD.

It is hereby certified that in Letters Patent No. 1,156,503, granted October 12, 1915, upon the application of Lucian A. Sheldon, of Schenectady, New York, for an improvement in "Steam-Flow Meters," an error appears in the printed specification requiring correction as follows: Page 2, line 1, for the word "stream" read *steam;* and that the said Letters Patent should be read with this correction therein that the same may conform to the record of the case in the Patent Office.

Signed and sealed this 9th day of November, A. D., 1915.

[SEAL.]

J. T. NEWTON,

*Acting Commissioner of Patents.*